May 8, 1951 F. B. SETTERBLADE 2,552,224
FISHING LURE
Filed May 20, 1949
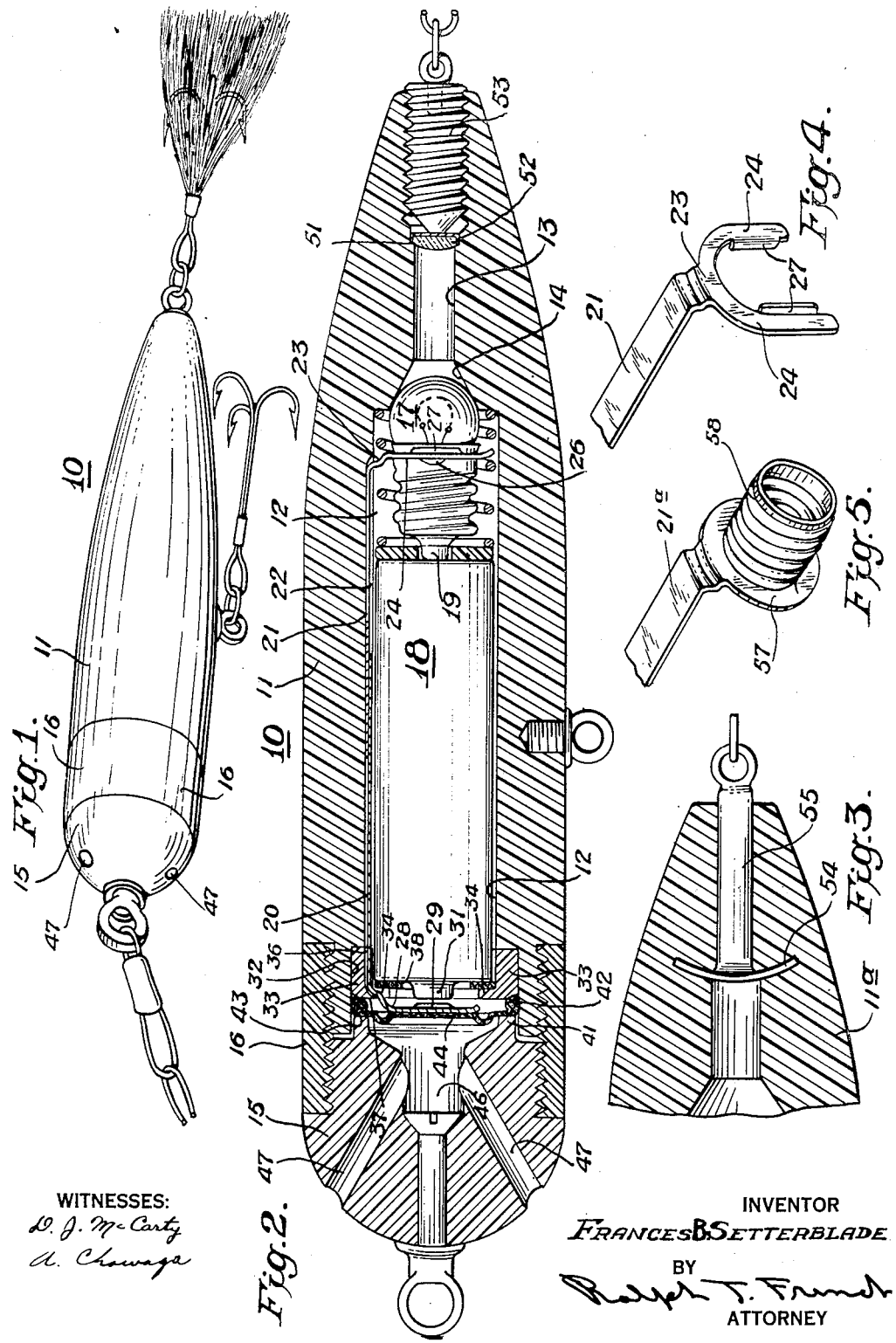
WITNESSES:
D. J. McCarty
A. Chawaya
INVENTOR
FRANCES B. SETTERBLADE
BY
Ralph T. French
ATTORNEY Patented May 8, 1951

2,552,224

UNITED STATES PATENT OFFICE 2,552,224

FISHING LURE

Frances B. Setterblade, Prospect Park, Pa.

Application May 20, 1949, Serial No. 94,353

2 Claims. (Cl. 43—42.07)

This invention relates to fishing lures, plugs or artificial baits, more particularly to articles of this type which are equipped with self-illuminating means, and has for an object to provide improved devices of this character.

Another object of the invention is to provide, in a fishing lure or the like having an electric light bulb and a battery for energizing the latter, means for controlling lighting of the bulb solely in response to hydraulic pressure effective upon submersion of the lure in the water.

In known prior lures incorporating a bulb and battery for self-illumination, lighting of the bulb requires some special act on the part of the user; for example, manual adjustment before putting the lure in the water, jerking of the line, drawing the lure through the water, etc.

With the present invention, on the other hand, no extra or special act by the user is involved in lighting the bulb; closing of the electrical circuit being effected simply by submersion of the lure in the water, the pressure of the latter acting upon a flexible diaphragm to move a switch member to circuit-closing position.

Therefore, a further object of the invention is to provide means for automatically illuminating a fishing lure or the like upon its submersion in the water.

Yet another object of the invention is to provide a hollow fishing lure or the like containing an electric bulb and battery, together with a flexible waterproof member protecting the bulb and battery from moisture.

Inasmuch as generally it will be found desirable to have the lure illuminated as soon as it is submerged to a depth within a range of a few inches to a few feet, the diaphragm against which the hydraulic pressure acts to close the light circuit will be quite thin and hence subject to rupture if exposed at the outer surface of the lure, where it could be contacted by objects in the water or punctured by the striking of a fish.

Accordingly, another object of the invention is to provide, in a self-illuminated fishing lure or the like, control mechanism for the light and including a thin flexible member, together with novel means for protecting the latter from rupture while at the same time rendering it subject to hydraulic pressure of the water.

A further object of the invention is to provide an electrically-illuminated fishing lure or the like whose electric circuit is controlled by hydraulic pressure produced by movement of the lure through the water.

Another object of the invention is to provide, in a fishing lure having a longitudinally-aligned battery and electric bulb for illumination of the lure, an electrical connector between the bulb and the far end of the battery, which connector is of adjustable length to fit batteries of varying lengths.

Yet another object of the invention is to provide novel means for supporting an electric bulb relative to a battery within a hollow fishing lure or the like.

A further object of the invention is to provide novel means for obtaining maximum illumination of a fishing lure from a source of light within the latter.

These and other objects are effected by the invention as will be apparent from the following description and claims, taken in accordance with the accompanying drawings forming a part of this application, wherein;

Fig. 1 is a perspective view of a fishing lure constructed in accordance with the invention;

Fig. 2 is a longitudinal sectional view through a fishing lure such as shown in Fig. 1;

Fig. 3 is a fragmentary detailed view of a modified construction;

Fig. 4 is a perspective view of a detail of construction concerning support of a bulb; and, Fig. 5 is a view similar to Fig. 4, but showing an alternative construction.

Referring now to the drawings more in detail, the reference character 10 indicates, in its entirety, a fishing lure comprising a body portion 11 of transparent or translucent material having a central longitudinal main bore 12 terminating in an extension bore 13 of reduced diameter in the tail or rear end of the lure, the bore portions 12 and 13 preferably being joined by an intermediate tapered bore portion 14.

At the forward end of the lure 10 is a head or cap portion 15 detachably secured to the body portion 11 by suitable means, such as the internally-threaded sleeve or coupling 16, with the result that the bore 12 is readily accessible for renewal of a small electric light bulb 17 and dry cell battery 18 housed therein.

Preferably, the bulb 17 is so disposed that its light is directed generally rearwardly with its glass body engaging the tapered portion 14 of the bore and the contact 19 at the opposite end of its threaded base abutting the adjacent bottom end of the dry cell battery 18.

A two-part contact strip 20-21, of suitable conductive material (for example, copper or aluminum), is disposed in a longitudinally-extending groove or recess 22 in the side wall of the bore 12 and has, on the part 21, a bifurcated terminal portion 23 whose arms 24 extend transversely of the bore 12 and frictionally embrace the metal base of the bulb 17 at the opposite sides of the latter, preferably in contact with the usual drop of solder 26. To provide ample contact surface on the opposed inner edges of the arms 24, the latter may include integral flanges 27 extending at right angles to the plane of the arms, and preferably in opposite directions (Fig. 4).

The part 20 of the two-part contact strip 20—21 includes a terminal portion 28 extending diametrically of the bore 12 with the central contact surface 29 on its rearward side disposed in slightly-spaced relation to the central contact 31 of the battery 18.

The forward end of the bore 12 is rabbeted, as at 32, and a spacer ring 33 of insulating material is positioned therein and carries an inwardly-extending radial flange 34 overlying the end of the battery and holding the latter in contact with the bulb 17. The spacer ring 33 is slotted, as at 36, for passage of the contact strip 20, but the forward end of the slot is partially obstructed by a lip 37 which engages the contact strip terminal portion 28 adjacent its junction with the strip 20 and holds it against an insulating washer 38 which overlies the forward end of the usual metal wall or casing of the battery to prevent grounding of the contact strip 20 against such metal wall.

The inner end of the head portion 15 has a rearwardly-projecting annular flange 41 axially aligned with the spacer ring 33 and cooperating with the latter to clamp therebetween a ring gasket 42 and the annular peripheral flange 43 of a flexible diaphragm 44. The end of the spacer ring 33 may be chamfered to provide a gasket seat inclined toward the inner surface of the body wall to provide three-way sealing. The axial dimensions of the threaded sections of the head 15, body 11 and coupling 16 are such that the gasket 42 is compressed between the head, body and spacer ring to provide a liquid-tight seal at the joints between these three elements, thereby preventing damage to the battery from moisture entering the bore 12.

The head 15 is chambered, as at 46, one wall of this chamber being comprised by the flexible diaphragm 44. One or more passages 47 provide unrestricted communication between the chamber 46 and the exterior of the lure, whereby, when the lure is submerged in the water, the chamber 46 will be filled with water and the diaphragm 44 subjected to the pressure of the latter.

The flexibility of the contact strip terminal portion 28 and of the diaphragm 44 are such that submergence of the lure in the water a few inches produces sufficient pressure on the diaphragm to flex the contact strip terminal portion 28 and cause engagement of the central contact surface 29 with the central contact 31 of the battery, thereby closing the electric circuit and lighting the bulb.

It will be apparent that varying the flexibility of either the diaphragm or the terminal portion, or of both, can be utilized to cause the circuit to close at any desired depth of submergence of the lure. Furthermore, the flexibility of these members may be such that the circuit will not be closed by submergence alone, but increased pressure on the diaphragm due to movement of the lure through the water, as in trolling, will be necessary to close the circuit and produce illumination of the lure.

An important advantage of the above-described construction is that the necessarily thin diaphragm (preferably rubber) is suitably protected from injury, due to its location entirely within the lure, yet is freely subject to pressure conditions upon changes in depth or rate of movement through the water.

The contact-strips 20—21 are of such lengths that their adjacent ends overlap, as at 49, and while structurally independent, are in contact with each other to maintain an electrical connection at all times, regardless of variations in the total overall length of the battery and bulb.

The extension bore 13 of the lure tail portion preferably has a mirror or reflector 51 positioned therein and retained against a rearwardly-facing shoulder 52 by a stud 53 threadedly mounted in the rear end of the extension bore. The rearwardly-directed rays of light from the bulb 17 strike the mirror or reflector 51 and are reflected longitudinally through the body 11 to illuminate the latter.

In Fig. 3 there is illustrated a modification wherein a reflector 54 and integral shank 55 are molded into the rearward portion of the body 11a.

Fig. 5 shows a modification of the bulb-holding contact strip, wherein the strip portion 21a terminates in a transverse ringlike portion 57 having integral therewith a threaded sleeve 58 for reception and retention of the bulb 17.

Throughout the specification and claims, the term "water" has been used in the broad sense, as covering any medium in which fish might be found.

While the invention has been shown in several forms, it will be apparent to those skilled in the art that it is not so limited, but is susceptible of variations and modifications without departing from the spirit thereof.

What is claimed is:

1. In a fishing lure or the like, a submergible hollow body having an access opening, a lamp and battery housed in said hollow body, means providing an electric circuit for said lamp and battery and including a normally-open switch interrupting the circuit, sealing means for the access opening comprising a flexible diaphragm, a closure member for said access opening disposed in covering relation to said flexible diaphragm and having an opening therethrough for passage of water to the outer face of the diaphragm, said diaphragm being so arranged with respect to the normally-open switch that hydraulic pressure on the diaphragm, effective upon submergence of the lure in water, moves said switch to circuit-closing position.

2. In a fishing lure or the like, a submergible hollow body having at least one opening through a wall thereof, a lamp and a battery housed in said hollow body, means providing an electric circuit for said lamp and battery and including a normally-open switch movable to closed position by hydraulic pressure effected by submergence of the lure in the water, a flexible diaphragm separating the interior of the hollow body into a first moisture-proof chamber housing the lamp, battery and circuit-providing means, and a second water-receiving chamber having direct communication with the exterior of the lure through said opening, hydraulic pressure in said second chamber acting through said flexible diaphragm to move the normally-open switch to closed position.

FRANCES B. SETTERBLADE.

REFERENCES CITED

The following references are of record in the file of this patent:

UNITED STATES PATENTS

| Number | Name | Date |
|---|---|---|
| 1,347,423 | Vince | July 20, 1920 |
| 1,617,091 | Wunderlin | Feb. 8, 1927 |
| 2,002,135 | Barton | May 21, 1935 |
| 2,070,818 | Winckler | Feb. 16, 1937 |
| 2,500,442 | Waite | Mar. 14, 1950 |